(12) United States Patent
Erikson et al.

(10) Patent No.: US 9,632,904 B1
(45) Date of Patent: Apr. 25, 2017

(54) ALERTING BASED ON SERVICE DEPENDENCIES OF MODELED PROCESSES

(71) Applicant: CA, Inc., Islandia, NY (US)

(72) Inventors: Erik M. Erikson, Seattle, WA (US); Aaron Kenneth Blackwell, Redding, CT (US); Trey Kubena, Redmond, WA (US)

(73) Assignee: CA, Inc., New York, NY (US)

(*) Notice: Subject to any disclaimer, the term of this patent is extended or adjusted under 35 U.S.C. 154(b) by 745 days.

(21) Appl. No.: 13/769,081

(22) Filed: Feb. 15, 2013

(51) Int. Cl.
*G06Q 10/10* (2012.01)
*G06F 11/34* (2006.01)
*G06F 17/30* (2006.01)

(52) U.S. Cl.
CPC ....... *G06F 11/3447* (2013.01); *G06Q 10/101* (2013.01); *G06F 17/30011* (2013.01); *G06Q 10/10* (2013.01); *G06Q 10/103* (2013.01)

(58) Field of Classification Search
CPC ................. G06F 17/5009; G06F 9/455; G06F 2201/865; G05B 17/02
USPC .............................................. 703/21, 22, 23
See application file for complete search history.

(56) References Cited

U.S. PATENT DOCUMENTS

| | | | | |
|---|---|---|---|---|
| 7,992,045 B2* | 8/2011 | Bansal | ................ | G06F 11/3495 714/38.1 |
| 2001/0047311 A1* | 11/2001 | Singh | ..................... | G06Q 30/06 705/26.1 |
| 2002/0022952 A1* | 2/2002 | Zager et al. | ..................... | 703/22 |
| 2005/0114867 A1* | 5/2005 | Xu | ...................... | G06F 11/1438 719/318 |
| 2005/0172306 A1* | 8/2005 | Agarwal et al. | .............. | 719/328 |
| 2005/0256732 A1* | 11/2005 | Bauer | .................... | G06Q 10/10 709/201 |
| 2006/0106761 A1* | 5/2006 | Sarangam | ........... | H04L 41/0681 |
| 2007/0130152 A1* | 6/2007 | Kosov | .............. | G06F 17/30011 |
| 2007/0143323 A1* | 6/2007 | Vanrenen | .............. | G06F 9/5038 |

(Continued)

OTHER PUBLICATIONS

Anis Charfi, NPL, "A plug-in architecture for self adaptive web service compositions", IEEE 2009.*

(Continued)

*Primary Examiner* — Kibrom K Gebresilassie
(74) *Attorney, Agent, or Firm* — Vierra Magen Marcus LLP (57) ABSTRACT

A method, system, and computer program product for raising an alert when some subject process is impacted by performance degradation of a software application are disclosed. The real word process may be modeled and executed on a computing device. Service dependencies in the modeled process are correlated to services provided by a managed application. An APM system monitors the managed application to determine when the services it provides may have some degradation. When a degradation of performance of the managed application is determined, a modeled process that has a service dependency that correlates to the degraded performance is determined. Then, an alert is generated to indicate that the process being modeled may be comprised. Therefore, instead of simply reporting that the managed application has some degradation, the alert provides a warning that some broader process outside of the managed application may be compromised.

16 Claims, 5 Drawing Sheets

(56) References Cited

U.S. PATENT DOCUMENTS

| | | | |
|---|---|---|---|
| 2008/0010005 A1* | 1/2008 | Small | G08G 5/00 701/120 |
| 2008/0010107 A1* | 1/2008 | Small | G06Q 10/06 705/1.1 |
| 2008/0046167 A1* | 2/2008 | Small | G06Q 10/00 701/120 |
| 2009/0216874 A1* | 8/2009 | Thain | G06Q 10/10 709/224 |
| 2009/0235157 A1 | 9/2009 | Iwasaki | |
| 2010/0138703 A1* | 6/2010 | Bansal | G06F 11/3495 714/57 |
| 2011/0276968 A1 | 11/2011 | Kand et al. | |
| 2012/0029932 A1* | 2/2012 | Stein | G06F 19/345 705/2 |
| 2012/0084351 A1 | 4/2012 | Yato et al. | |

OTHER PUBLICATIONS

Alexander Keller, NPL, "Determining service Dependencies in Distributed systems", IEEE 2001.*

Anis Charfi, NPL, "A plug-in architecture for self-adaptive web service compositions", IEEE 2009, pp. 35-42.*

Alexander Keller, NPL, "Determining service Dependencies in Distributed systems", IEEE 2001, pp. 1-5.*

Alves, et al., "Web Services Business Process Execution Language Version 2.0", OASIS Standard, OASIS Web Services Business Process Execution Language (WSBPEL) TC, Retrieved from the Internet: <URL:http://docs.oasis-open.org/wsbpel/2.0/OS/wsbpel-v2.0-OS.html> , Apr. 11, 2007, 264 pages.

Baresi, et al., "Dynamo: Dynamic Monitoring of WS-BPEL Processes", Service-Oriented Computing—ICSOC 2005, Third International Conference, Amsterdam, The Netherlands, Dec. 12-15, 2005, pp. 478-483, 6 pages.

Baresi, et al., "Towards Dynamic Monitoring of WS-BPEL Processes", Service-Oriented Computing—ICSOC 2005, Third International Conference, Amsterdam, The Netherlands, Dec. 12-15, 2005, pp. 269-282, 14 pages.

Charfi, et al., "A Plug-in Architecture for Self-Adaptive Web Service Compositions", Proceedings of the 2009 IEEE International Conference on Web Services, Jul. 6-10, 2009, pp. 35-42, 8 pages.

* cited by examiner

ALERTING BASED ON SERVICE DEPENDENCIES OF MODELED PROCESSES

BACKGROUND

The present disclosure relates to monitoring a software application and reporting how performance of the software application may impact a modeled process that depends on the software application.

Business owners promote the predictable success of their business by clearly defining and iteratively improving the goals, policies, and procedures of the organization. Technologically, this has been assisted by products that help business owners in this task of defining and managing the business's processes. These products are sometimes referred to collectively as Business Process Management (BPM) tools. Workflow Engines are a related tool. A workflow engine is a software application that manages and executes modeled computer processes.

Using such tools, processes may be modeled and executed. For example, business owners may define Business Processes (BP) and execute models of the Business Processes on a computing device. This may involve modeling a business process as a sequence of actions having some flow. The business process, when executed on the computing device, may be able to access some external service, such as a Web Service. The external service may be referred to as a "partner". Based on results of the execution, the Business Process may be refined and improved. Note that such tools are not limited to Business Processes. For example, a workflow could be modeled and executed on a computing device.

Such tools can perform a variety of functions including monitoring the progression or execution of process instances, discovering new processes and/or compliance with existing processes, as well as recording and auditing of process related activities.

Numerous languages have been developed to allow a user to model and execute processes such as Business Processes and workflows. One example is the Web Services Business Process Execution Language (WS-BPEL). WS-BPEL defines a model and a grammar for describing the behavior of a business process based on interactions between the process and its partners. The interaction with each partner may occur through Web Service interfaces. In WS-BPEL, the structure of the relationship at the interface level may be encapsulated in what is referred to as a partnerLink. The WS-BPEL process defines how multiple service interactions with these partners may be coordinated to achieve a business goal, as well as the state and the logic necessary for this coordination.

BRIEF SUMMARY

According to one aspect of the present disclosure an electronic notification is received that a service provided by a managed application executing on a first computing device is degraded. The service provided by the managed application is automatically correlated to a modeled process that executes on a second computing device. The modeled process is based on a subject process. An electronic alert is generated that warns that the degradation of the service provided by the managed application may impact the subject process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Application Performance Management (APM) tools provide the operations personnel of an Information Technology (IT) organization with the ability to monitor the performance and health of software applications. The scope of this monitoring may extend across the stack from physical switches and servers all the way up to users who are consuming the applications being monitored. When there is a performance issue with an application, APM allows operations to know which users of the application are being affected. When a user has a problem with an application, it allows operations to find out exactly where things are going wrong for that user.

When an application experiences an incident, APM provides visibility into the application and user impacts that result from the incident. However those impacts often have a wider scope, affecting subject processes (e.g., business processes) that the applications enable. Without visibility into those impacts, a larger burden is placed upon the employees of an organization to raise awareness of the impacts and to proactively address them. Inevitable human failures and missed communication can compound these impacts such that the disruptions escalate into expensive crises.

Techniques disclosed herein go beyond reporting performance information about software application. Embodiments raise an alert that identifies some subject process outside of the software application that may be impacted by degradation of the software application. In one embodiment, service dependencies in a modeled process are correlated to services provided by a managed application. An APM system monitors the managed application to determine when the services it provides may have some degradation. When a degradation of performance of the managed application is determined, a modeled process that has a service dependency that is correlated with the services of the managed application with degraded performance is determined. Then, an alert is generated to indicate that the subject process being modeled may be comprised. Therefore, instead of simply reporting that the managed application has some degradation, the alert provides a warning that some broader process outside of the managed application may be compromised.

In some cases, the subject processes that are modeled are business processes. Therefore, greater insight and awareness is provided of impacts to the function of business by the applications they depend upon to drive revenue. By gaining insight into the dependencies of their organization, business process managers can proactively plan for the disruptions to business that can occur when the performance of software applications degrades. By being proactively notified of the impacts of incidents, business process managers can immediately act upon contingency plans that they have developed in order to protect customer satisfaction, business continuity, and business value.

The subject process that is modeled could include, but is not limited to, a software sequential process, a decision process, an approval process, and/or physical process.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
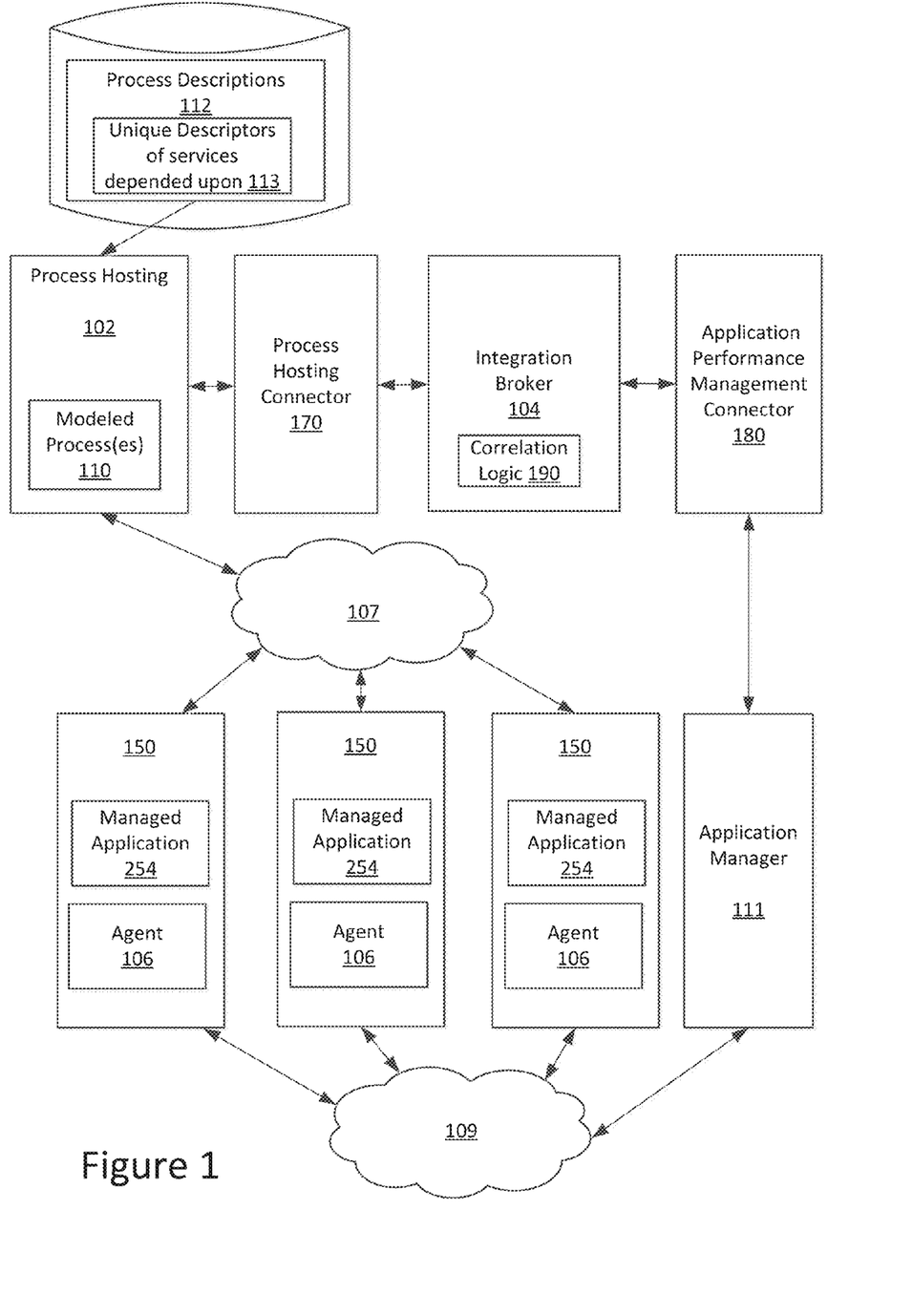
FIG. 1 illustrates one embodiment of a system for sending alerts when a modeled process may be impacted by a problem with a managed application.

Referring now to FIG. 1, one embodiment of a system for sending alerts when a subject process may be impacted by a problem with a managed application is depicted. The system includes a process hosting computing device 102, several managed computing devices 150, an Application Manager 111, an Integration Broker 104, a process hosting connector 170, and an Application Performance Management (APM) connector 180.

The process hosting computing device 102 executes a modeled process 110. The process hosting computing device 102 could be what is sometimes referred to as a workflow engine (or workflow server) or what is sometimes referred to as a business process management engine (or server). Each of the modeled processes 110 could be a model of a business process, or some other subject process. In one embodiment, a modeled process 110 is modeled using the Web Services Business Process Execution Language (WS-BPEL). However, another process description standard could be used.

The process hosting computing device 102 has access to process descriptions 112 that may be stored on a computer readable storage device. The process descriptions 112 describe the modeled processes 110 that are to be executed on the process hosting computing device 102. There may be any number of process hosting computing devices 102, each of which may simulate any number of modeled processes 110.

In one embodiment, the process descriptions 112 are described using the Web Services Business Process Execution Language (WS-BPEL). WS-BPEL may use XML type statements to describe a process (e.g., business process). The process description 112 may be described using a technique other than WS-BPEL.

A process description 112 may identify some external service upon which a modeled process 110 is dependent when it executes on the process hosting device 102. Thus, a modeled process 110 may be dependent upon one or more external services. By an external service, it is meant some service outside of the execution of the modeled process 110. These external services could be a technical asset. For example, the external service could be satisfied by a Web Service call. In some cases, the external service could be related to (e.g., provided by) one of the Managed Applications 254.

In one embodiment, the process description 112 includes one or more Unique Descriptors 113 of external services upon which the modeled process depends. In one embodiment, the Unique Descriptors 113 of external services are URIs (Uniform Resource Identifier) that identify the external service(s) upon which the modeled process depends. However, identifiers other than URIs could be used to identify the external service(s) upon which the modeled process depends. Other non-limiting examples include a Global Unique Identifier (GUID) and a Universally Unique Identifier (UUID).

As one example, in BPEL a partnerLink may be used to identify an external service dependency. A partnerLink is a logical link from a BPEL process to an external Web service, or to a client who invokes the business process. In real world situations, usually a business process designer uses existing Web services. Therefore, in order to create a partnerLink, first of all, a partnerLink type should be defined in the partner service.

In one embodiment, there is a Web Services Description Language (WSDL) file that is associated with and imported by the BPEL file that describes the modeled process 110. The WSDL file may describe network services. The WSDL file may include <service> declarations that may include the declaration of the URI where the service may be invoked. The WSDL file may declare partnerLinks that reference the declared WSDL <service> declarations.

The managed computing devices 150 each execute a managed application 254. The Agents 106 reside on the managed computing devices 150 and collect data regarding the performance of the managed applications 254. The managed computing devices 150 may be any type of computing device having a processor for executing code to achieve a desired functionality. The managed computing devices 150 can be located remotely from one another or co-located.

In one embodiment, the Agents 106 report metric data to the Application Manger 111. Metric data may pertain to the performance of a managed application 254. For example, a corporation running an enterprise application such as a web-based e-commerce application may employ a number of application servers at one location for load balancing. Agent software 106 running on the managed computing devices 150 gather information from an application, middleware or other software running on the respective managed computing devices 150. Such information may be obtained using instrumentation, one example of which is byte code instrumentation. However, the gathered data may be obtained in other ways as well. The Agents 106 essentially live in the computing device being monitored and provide a data acquisition point. The managed computing devices may be considered to be front end subsystems.

The Manager 111 can be provided on a separate computing device such as a workstation that communicates with a user interface, such as a monitor, to display information based on data received from the Agents 106. To illustrate, a web-based e-commerce enterprise might obtain agent data from servers at different geographic locations that receive customer orders, from servers that process payments, from servers at warehouses for tracking inventory and conveying orders, and so forth. Other applications which are not necessarily web-based or involve retail or other sales similarly employ Agents 106 for monitoring their systems. For example, a bank may use an application for processing checks and credit accounts. Moreover, in addition to the multi-computing device arrangements mentioned, a single computing device can be monitored as well with one or more Agents 106.

Various approaches are known for instrumenting software to monitor its execution. For example, tracing may be used to track the execution of software. One example of tracing is discussed in U.S. Pat. No. 7,870,431, issued Jan. 11, 2011, titled "Transaction Tracer," and incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it may be referred to as a managed application, and a computing device on which the application runs may be referred to as a managed computing device. The agent software receives information from the probes and may communicate the information to another process, or process the information locally, such as to determine whether the information indicates an abnormal condition. The Agent 106 thus collects and summarizes information received from the probes. The probes collect information as may be defined by a directives file. For example, the information from the probes may indicate start and stop times of a transaction or other execution flow, or of individual components within a transaction/execution flow. This information can be compared to pre-established criteria to determine if it is within bounds. If the information is not within bounds, the Agent 106 can report this fact so that appropriate troubleshooting can be performed. The Agents 106 are typically aware of the software executing on the local managed computing device with which they are associated.

The Integration Broker 104 may serve as a bridge between the Application Manager 111 and the process hosting computing device 102. In one embodiment, the Integration Broker 104 performs translations to allow endpoints to communicate. In one embodiment, the Integration Broker 104 has a set of universal type definitions. In one embodiment, the Integration Broker 104 provides for an intermediary language to allow connecting parties to speak the same language. The Integration Broker 104 also has correlation logic 190, which make correlations between services provided by the Managed Applications 254 and external service dependencies associated with the modeled processes 110, in one embodiment.

The process hosting connector 170 facilitates communication and interactions between the Integration Broker 104 and the process hosting computing device 102. In one embodiment, the process hosting connector 170 is a plug-in to the Integration Broker 104. In one embodiment, the process hosting connector 170 accesses Unique Descriptors of external services from the process description 112 such that they are available for the correlation logic 190.

The Application Performance Management (APM) connector 180 facilitates communication and interactions between the Integration Broker 104 and the Application Manager 111. In one embodiment, the APM connector 180 accesses Identifiers of Application Entry Points from the Application Manager 111 such that they are available for the correlation logic 190.

Network 107 allows the process hosting computing device 102 and the application computing devices 150 to communicate. For example, the process hosting computing device 102 could make a web services call to an external service provided by one of the managed applications 254.

Network 109 allows the application computing devices 150 and the Application Manager 111 to communicate. For example, the Agents 106 can report performance data to the Application Manger 111.

The networks 107 and 109 can be the same, overlapping or distinct, and can include, e.g., the Internet, another wide area network, and/or a local area network.

Figure 2:
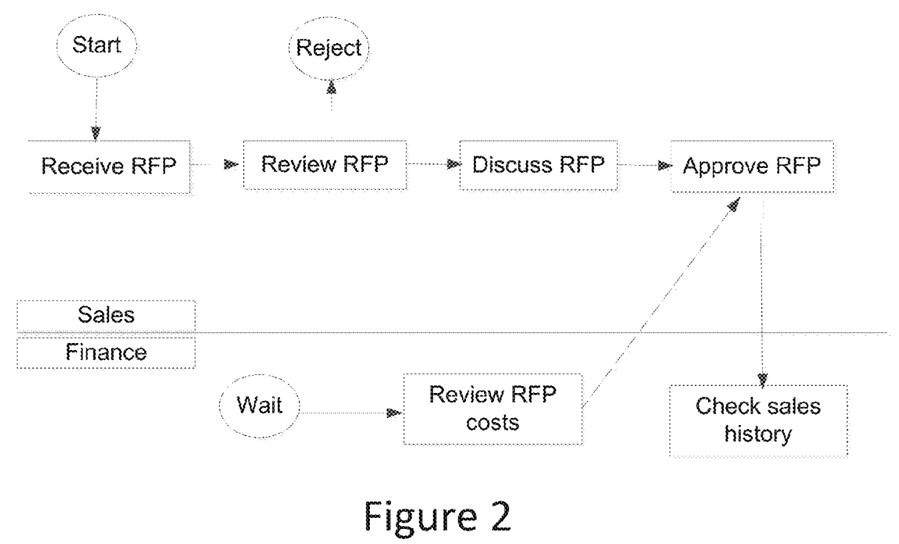
FIG. 2 is an example of a subject process that can be modeled and executed in a process hosting computing device.

FIG. 2 is an example of a subject process that can be modeled and executed in a process hosting computing device 102. As one example, BPEL can be used to model and execute this subject process in process hosting computing device 102. This example is divided between actions in the sales department and the finance department. In this example, at the start a customer submits a Request for Proposal (RFP). The RFP is sent to a manager, who reviews it and may either reject the RFP approve it after further analysis. The finance department waits until the manager approves the RFP before reviewing costs. After the RFP is approved, the finance department may check sales history.

FIG. 2 shows just one possibility of a subject process. The subject process that is modeled could include, but is not limited to, a software sequential process, a decision process, an approval process, and/or a physical process.

The subject process may depend on performance of a Managed Application 254 or some service provided by the Managed Application 254. Thus, performance degradations of the Managed Application 254 may impact the subject process. However, simply knowing that there is a performance degradation of the Managed Application 254 may not provide full insight into how the subject process may be impacted. For example, if a server that the finance department uses has a performance degradation, the subject process may or may not be impacted. Embodiments disclosed herein examine external service dependency of the modeled process 110 that is executed on the process hosting computing device 102 to determine when a subject process (which is the subject of the model 110) may be impacted by performance degradation of a Managed Application 254.

Figure 3:
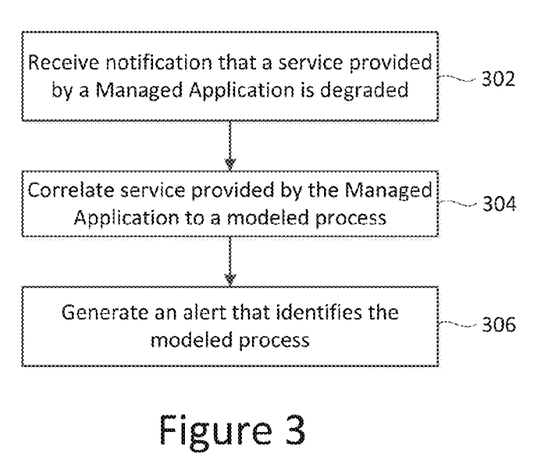
FIG. 3 is a flowchart of one embodiment of a process of generating an alert when a managed application has a fault that may impact a subject process that is being modeled.

FIG. 3 is a flowchart of one embodiment of a process of generating an alert when a Managed Application 254 has a fault that may impact a subject process that is being modeled. Reference will be made to various elements of FIG. 1 when describing the process of FIG. 3, but the process is not limited to the system of FIG. 1. In step 302, an electronic notification is received that service provided by a Managed Application 254 executing on a first computing device is degraded. The first computing device may be a managed computing device 150, such as one of the examples in FIG. 1. In one embodiment, the Integration Broker 104 receives the notification from the APM connector 180. This notification may have been triggered based on performance data gathered by Agents 106. Further details are described below.

The service degradation may be that the Managed Application 254 has some degradation in performance. As one example, the managed computing device 150 may provide services for the finance department of a corporation. The degradation may be some fault that is associated with an entry point of the Managed Application 254. Stated another way, the notification may indicate that one of the entry points is compromised during execution of the Managed Application 254.

In step 304, the service provided by the Managed Application 254 is automatically correlated to a modeled process 110 that is executed on a second computing device. The second computing device may be a device that executes a model of a process, such as process hosting computing device 102 in the system of FIG. 1. As one example, the subject process depicted in FIG. 2 could be modeled in a language such as BPEL and executed on process hosting computing device 102. The process hosting computing device 102 may execute many such modeled processes 110.

In one embodiment, the Integration Broker 104 performs the correlation. Note that the process hosting device 102 does not need to be executing the modeled process 110 at the time that the correlation is performed. Likewise, the process hosting device 102 does not need to be executing the modeled process 110 at the time that the problem with the Managed Application 254 happened, was discovered, and/or was reported to the Integration Broker 104.

In step 304, the service provided by the Managed Application 254 may be correlated to one (or more) of the modeled processes 110. Step 304 may also operate at a finer level of granularity, such that the service provided by the Managed Application 254 may be correlated to some portion of a given modeled process 110. For example, the modeled process 110 may have a portion that models the step of finance reviewing the proposal cost. Step 304 may correlate the service provided by the Managed Application 254 to that step, as one example.

In step 306, an electronic alert is generated that identifies the modeled process 110. The alert may identify a root cause of a potential problem associated with the modeled process 100. In one embodiment, the alert that warns that the degradation of the service provided by the Managed Application 254 may impact a subject process being modeled. For example, the alert may identify the service provided by the Managed Application 254 that has a performance degradation. The alert could also identify some specified portion of the modeled process 110, such as the step of finance reviewing the proposal costs. The alert may identify a step or some other portion of the modeled process 110 that depends on the service provided by the Managed Application 254.

The alert may be sent in the form an electronic message. In one embodiment, the alert is provided to the process hosting connector 170. The process hosting connector 170 may provide the alert to the process hosting computing device 102. In one embodiment, step 306 includes sending an e-mail message to someone who is managing a subject process that is being modeled. This person may be identified in a configuration file associated with the modeled process 110.

Note that the alert does not mean that there is necessarily any problem with the process being executed on the second computing device. Instead, the alert may be a warning that there may be a potential problem with a subject process that is being modeled in the process being hosted by the processes hosting device 102. For example, the subject process may be processing RFPs. This subject process may be modeled and executed on the processes hosting device 102. The alert may have been generated due to some problem with a Managed Application 254 that provides services for the finance department. However, simply reporting that there is a problem with the Managed Application 254 that provides services for the finance department may provide little insight into how this may impact the business overall. By correlating the fault in the Managed Application 254 to one of the modeled processes 110, and generating an alert thereon, insight may be gained as to how the fault may impact the overall business. Also, the alert may identify what portion of the modeled process 110 is impacted such that insight into how the modeled process 100, and hence the subject process, will be impacted may be inferred. This may allow the subject process to be re-designed and/or for some contingency plan to be put into place.

Figure 4:
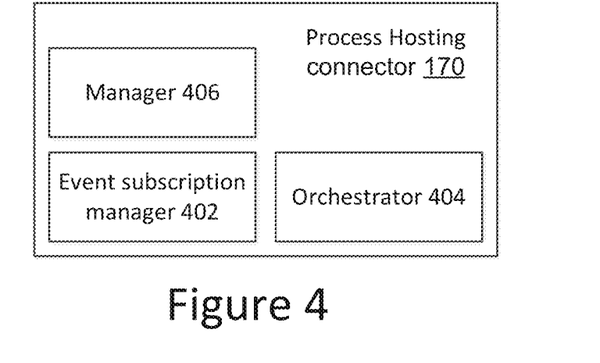
FIG. 4 is a diagram that illustrates further details of one embodiment of the process hosting connector.

FIG. 4 is a diagram that illustrates further details of one embodiment of the process hosting connector 170. In general, the process hosting connector 170 has event subscription manager 402, orchestrator 404, and manager 406. Other elements (such as thread pools, etc.) are not depicted so as to not obscure the diagram.

The event subscription manager 402 may be used to subscribe to alerts that indicate that some modeled process 110 may be impacted by a service degradation in a Managed Application 254. In one embodiment, the event subscription manager 402 subscribes to an event related to a URI that is associated with a dependent external service. This URI may be specified in the process description 112.

The orchestrator 404 is responsible for understanding the overall flow of tasks for which the process hosting connector 170 is responsible. In one embodiment, orchestrator 404 queries for descriptions of model processes 110 and other information at initiation. The orchestrator 404 then sends this information to the Integration Broker 104. It may also update this information from time to time.

The manager 406 may be responsible for handing unique identifiers that are exchanged between the process hosting connector 170 and the Integration Broker 104. For example, modeled processes 110 may each be given a unique ID such that both the process hosting connector 170 and the Integration Broker 104 are certain which modeled process 110 is being referenced. The manager 406 may provide this unique ID when providing configuration items to the Integration Broker 104. Other configuration items, such as the particular process hosting computing device 102, may also be given a unique identifier. Note that the unique identifier for an external services dependency may be taken from the process description (e.g., URI).

Figure 5:
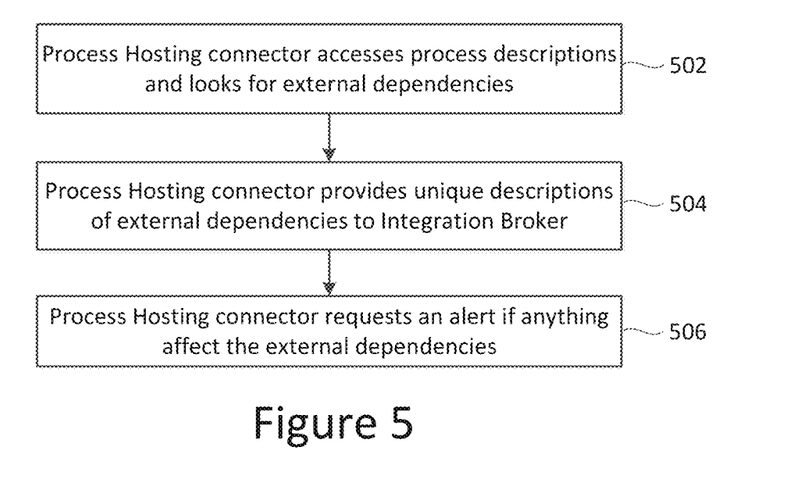
FIG. 5 is a flowchart of one embodiment of a process of actions taken by a process hosting connector.

FIG. 5 is a flowchart of one embodiment of a process of actions taken by a process hosting connector 170. The process may start when the process hosting connector 170 first comes up. In step 502, the process hosting connector 170 accesses process descriptions 112 and looks for external dependencies in the process descriptions 112. The process hosting connector 170 could make a web services call to the process hosting computing device 102 to request the process descriptions 112. The process descriptions 112 may be accessed from a computer readable medium that is accessible by the process hosting computing device 102.

In one embodiment, the process hosting connector 170 accesses one or more files that comply with BPEL (e.g., WS-BPEL). In one embodiment, a BPEL package directory is scanned for BPEL packages. As is known, the WS-BPEL syntax provides a way to create a file (or files) that may include a description of a business process, which is one example of a modeled process 110. For example, the syntax may be used to define a modeled process as in the simplified BPEL example in Table I.

TABLE I

```
<process name="MyProcess">
<partnerLinks>
        <partnerLink name="finance">
        <partnerLink name="accounting">
</partnerLinks>
<invoke partnerLink="finance">
</invoke>
<invoke partnerLink="accounting">
</invoke>
</process>
```

The process named "MyProcess" may have many other statements, but is simplified for ease of explanation. Some of these statements may indicate a sequence of a flow of actions. This example has two "partnerLink" definitions, which themselves may have properties such as "name," "partnerLink Type," "myRole," and "partnerRole." The invoke tag may have properties such as, "portType," "operation," "inputVariable," and "outputVariable." The <invoke> statement refers to an "activity" and may allow the business process to invoke a one-way or request-response operation on a portType offered by a partner. The <invoke> statement may itself include other statements that further define how the external service should be accessed, etc. Note that the above example is simplified. Also, multiple files may be used in the definition of a single business process.

In one embodiment, the process hosting connector 170 looks for <invoke> and <partnerLink> statements to determine external service dependencies. The <partnerLink> statements may reference some external service. The <invoke> statements that reference the partnerLinks may declare the invocation of the external service. As a result of this definition, the XML is also declaring the dependency of the defined process upon that external service. For example, when the modeled process 110 executes an <invoke> statement this could trigger a Web Service call. This Web Service call could be related to the Managed Application 254. As one example, such a Web Service call could invoke the Managed Application 254 at some entry point.

In one embodiment, there is a Web Services Description Language (WSDL) file that is associated with and imported by the BPEL file that describes the modeled process. This may be referred to as a "client" WSDL file. The client WSDL file further defines the values of the referential properties of the partnerLink definition in the BPEL file. Note that there may be one or more separate WSDL files imported by the client WSDL file that are associated with the service provided by the Managed Applications 254. Such WSDL files will be referred to as "partner" WSDL files.

The partner WSDL may define the services. It may do so by declaring the service tag(s) that declare what services are present. These may be given locations by the declaration of and reference to binding tag(s). These bindings may declare the portType they bind, which specifies the message type accepted and produced. The service tag(s) that reference these other definitions include the declaration of an address that provides an URI at which the service dependencies may be invoked. These URIs in the partner WSDL file may be correlated by the Integration Broker 104 with the corresponding URIs of the frontends of the managed application 254. However, the external service dependency may be identified in another manner.

Note that the foregoing example involving BPEL and WSDL is one possibility for step 502. However, the process descriptions and external dependencies that are accessed in step 502 could comply with some other language and/or protocol. The process descriptions and external dependencies could comply with an industry standard, be proprietary, or otherwise.

In step 504, the process hosting connector 170 provides Unique Descriptions 113 of the external dependencies to the correlation logic 190. Referring to FIG. 1, the Unique Descriptors 113 of services depended upon may be provided to the Integration Broker 104. In general, the process hosting connector 170 may provide a number of configuration items to the Integration Broker 104. Thus, step 504 may include providing other configuration items. The configuration items may include process descriptions 112 of the modeled processes, various stages of the modeled processes, the external dependencies of the modeled processes, etc. As noted herein, the external dependencies may be identified by a URI, in one embodiment.

In step 506, the process hosting connector 170 requests that it receive an alert if something impacts any of the external service dependencies. In one embodiment, subscriptions to the alerts are enacted by subscription objects that will handle the alert notifications from the Integration Broker 104.

Figure 6:
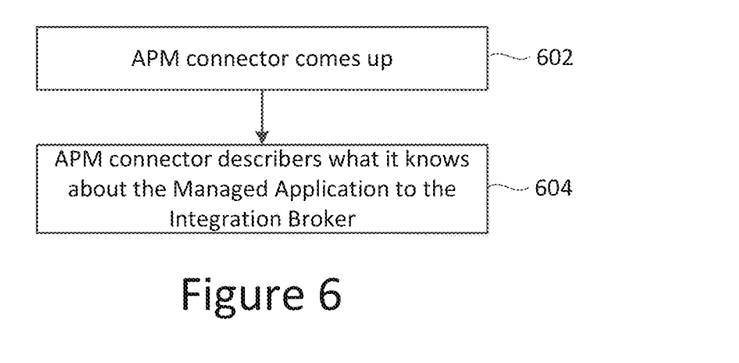
FIG. 6 is a flowchart of one embodiment of a process of actions performed by an APM connector when it first comes up.

FIG. 6 is a flowchart of one embodiment of a process of actions performed by an APM connector 180 when it first comes up. In step 602, the APM connector 180 first comes up. In step 604, the APM connector 180 provides configuration items to the Integration Broker 104. This may include describing what it knows about the Managed Application 254 to the Integration Broker 104. This may include reporting information about front ends, which may also be referred to as entry points. In one embodiment, a front end is identified by a URI that is used to access the front end. In one embodiment, the front end is a way to access a service provided by the managed application 254. In one embodiment, the APM connector 180 queries the Application Manager 111 for the front ends, as well as their URIs. Note that a URI is one example of a way to identify a front end. A front end may be identified by an identifier (or a composed set of identifiers) that either absolutely or with sufficient probability uniquely identifies a specific front end other than a URI.

Figure 7:
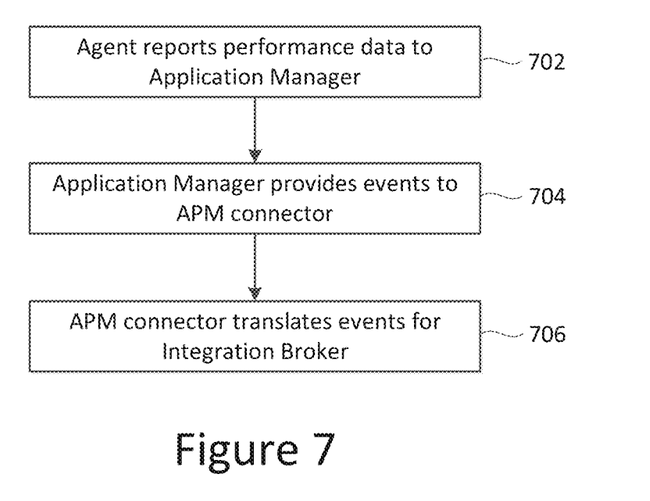
FIG. 7 is a flowchart of one embodiment of a process of translating performance data into events.

FIG. 7 is a flowchart of one embodiment of a process of translating performance data into events. Various steps in the process could be performed by the Agents 106, the Application Manager 111, and the APM connector 180. In step 702, the Agents 106 report performance data to the Application Manager 111. Note that this performance data may be used for other purposes that reporting the alerts pertaining to the modeled processes. The performance data may be used to generate reports on how the Managed Application 254 is performing. These reports can include information such as response times of transactions. As one particular example, a user can request a report for the average response time of a credit card transaction.

As previously discussed, the Agents 106 may receive information from probes in the Managed Application 254. The probes collect information as may be defined by a directives file. The probes measure specific pieces of information about the application without changing the application's business or other logic. For example, the information from the probes may indicate start and stop times of a transaction or other execution flow, or of individual components within a transaction/execution flow.

In step 704, the Application Manager 111 provides events to the APM connector 180. These events are based on the performance data. Examples of an event are that a Managed Application 254 or service provided thereby has some performance degradation, fault; an entry point is compromised etc. The determination whether the event is worthy of forwarding onward may be determined in a number of ways. The performance data may include response times. The determination could be based on whether response times meet some criteria, such as average response time. The determination could be some more catastrophic event, such as a crash that makes the dependent services completely unavailable or severely compromised.

In one embodiment, the Application Manager 111 able to determine which front end of the Managed Application 254 is impacted by the performance degradation. The front end may, at least in some cases, be correlated to a service provided by the Managed Application. Therefore, at least in some cases, the Application Manager 111 can determine a service provided by the Managed Application 254 that is impacted by the performance degradation. In some embodiments, the Manager 111 (or some other component) is able to provide a URI for the front end.

In step 706, the APM connector 180 translates the events for the Integration Broker 104. This translation may describe the events in a language and format that the Integration Broker 104 understands. Therefore, the Integration Broker 104 will be able to analyze the events, as described in the process of FIG. 8

Figure 8:
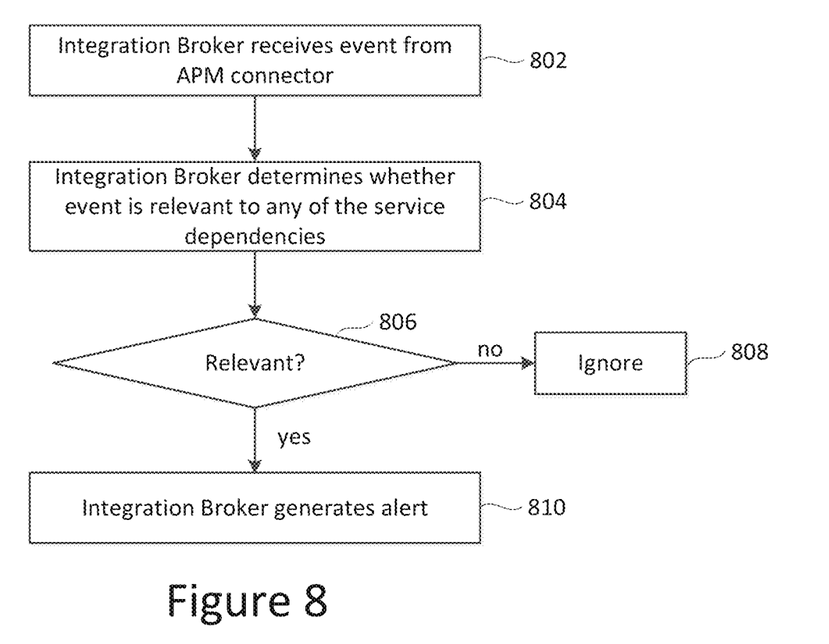
FIG. 8 is a flowchart of one embodiment of a process of generating alerts based on events received from the APM connector.

FIG. 8 is a flowchart of one embodiment of a process of generating alerts based on events received from the APM connector 180. In step 802, the Integration Broker 104 receives an event from the APM connector 180.

In step 804, the Integration Broker 104 determines whether the event is relevant to any of the external service dependencies that it is monitoring. These dependencies that it is monitoring are the ones that the process hosting connector requested be monitored. In one embodiment, the correlation logic 190 matches URIs that were provided by the process hosting connector to URIs associated with services provided by the Managed Application 254. When the Integration Broker 104 received the external service dependencies from the process hosting connector 170 it may receive a URI with each of the external service dependencies. The correlation logic 190 may determine a URI for the event, if it was not provided by the APM connector 180. Thus, the correlation logic 190 may determine whether there is a match for the URI associated with the event with any of the external dependencies, in step 806. If so (step 806 is yes), then the correlation logic 190 may generate an alert in step 810. If step 806 is no, then the event may be ignored by the Integration Broker 104.

In step 810, the correlation logic 190 generates an alert for the event, assuming the event is relevant. The alert may be provided to the process hosting connector 170. The content of the alert may identify the modeled process 110, some step in the modeled process (e.g., a step that is impacted by the service degradation), a URI associated with the service dependency in the process description 112, an identifier of the entry point in the Managed Application 254 that was a cause of the problem, etc.

Figure 9:
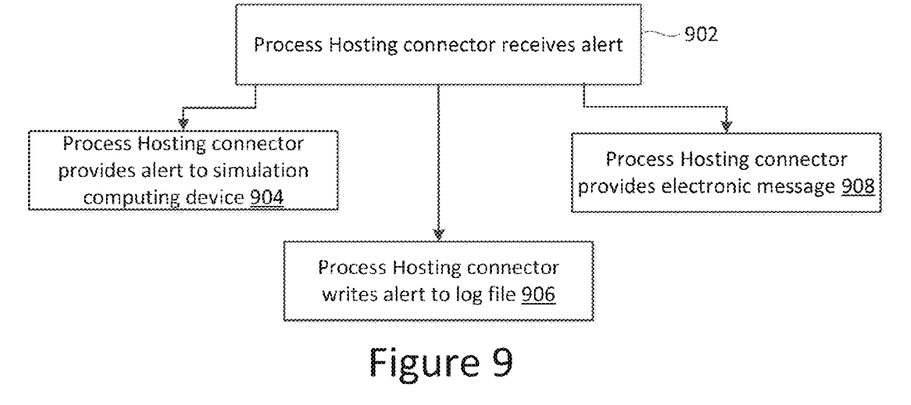
FIG. 9 is a flowchart of one embodiment of a process of the process hosting connector processing the alert.

FIG. 9 is a flowchart of one embodiment of a process of the process hosting connector 170 processing the alert. In step 902, the process hosting connector 170 receives the alert that was generated by the Integration Broker 104. There are numerous options of how the process hosting connector 170 may report the alert.

In optional step 904, the process hosting connector 170 provides the alert to the process hosting computing device 102. In optional step 906, the process hosting connector 170 provides the alert sent to a log file. This log file may be associated with the modeled process 110. In optional step 906, the process hosting connector 170 sends an electronic communication (e.g., e-mail) to an individual, etc.

When the alert is analyzed, the owner of the process may make changes to the subject process in response. As one example, some contingency plan may be put in place in response to a performance degradation of the service provided by the Managed Application 254. As another example, the subject process could be modified. In this case, the modeled process 110 could be modified in response. The process hosting connector 170 would report any updates to the modeled process 110 to the Integration Broker 104.

Figure 10:
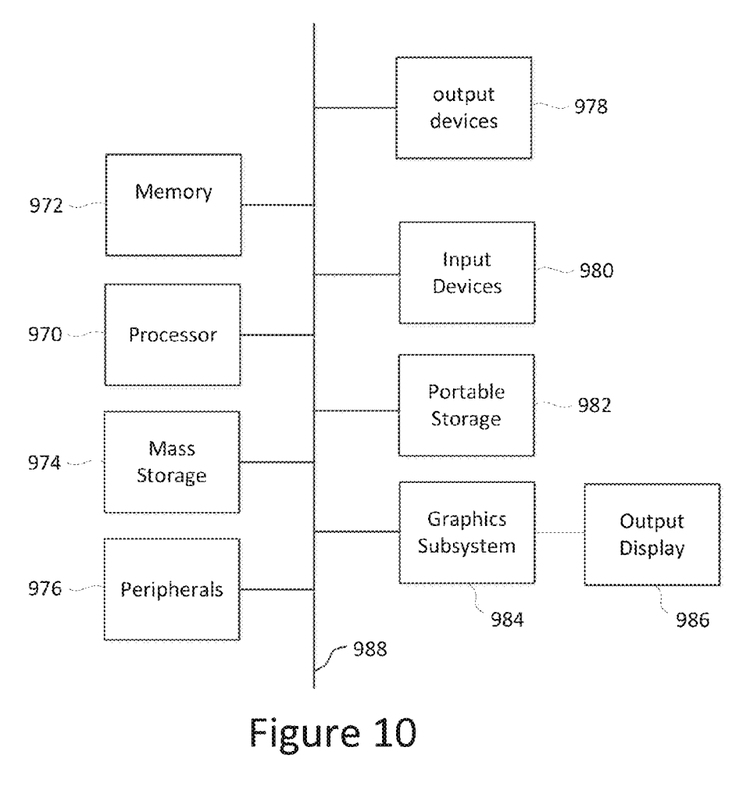
FIG. 10 illustrates a high level block diagram of a computer system which can be used to implement the technology described herein.

FIG. 10 illustrates a high level block diagram of a computer system which can be used to implement the technology described herein. The computer system of FIG. 10 includes a processor unit 970 in communication with main memory 972. Processor unit 970 may contain a single microprocessor, or may contain a plurality of microprocessors for configuring the computer system as a multi-processor system. These one or more processors can perform the methods described above. Main memory 972 stores, in part, instructions and data for execution by processor unit 970. If the system described herein is wholly or partially implemented in software, main memory 972 can store the executable code when in operation. Main memory 972 may include banks of dynamic random access memory (DRAM) as well as high speed cache memory. For example, main memory 972 can store the modeled processes 110, process hosting connector 170, Integration Broker 104, correlation logic 190, APM connector 180, Application Manager 111, Managed Application code 254, Agent code 106, etc.

The system of FIG. 10 further includes a mass storage device 974, peripheral device(s) 976, user input device(s) 980, output devices 978, portable storage medium drive(s) 982, a graphics subsystem 984 and an output display 986. For purposes of simplicity, the components shown in FIG. 10 are depicted as being connected via a single bus 988. However, the components may be connected through one or more data transport means. For example, processor unit 970 and main memory 972 may be connected via a local microprocessor bus, and the mass storage device 974, peripheral device(s) 976, portable storage medium drive(s) 982, and graphics subsystem 984 may be connected via one or more input/output (I/O) buses. Mass storage device 974, which may be implemented with a magnetic disk drive or an optical disk drive, is a non-volatile storage device for storing data and instructions for use by processor unit 970. In one embodiment, mass storage device 974 stores the system software for implementing the technology described herein for purposes of loading to main memory 972. Mass storage device 974 can also be used to store the process descriptions 112, which may include the Unique Descriptions of services dependent upon 113. Peripheral device(s) 976 may include any type of computer support device, such as an input/output (I/O) interface, to add additional functionality to the computer system. For example, peripheral device(s) 976 may include a network interface for connecting the computer system to a network, a modem, a router, etc. User input device(s) 980 provides a portion of a user interface (e.g., for Update Manager 260). User input device(s) 980 may include an alpha-numeric keypad for inputting alpha-numeric and other information, or a pointing device, such as a mouse, a trackball, stylus, or cursor direction keys. In order to display textual and graphical information, the computer system of FIG. 10 includes graphics subsystem 984 and output display 986. Output display 986 may include a cathode ray tube (CRT) display, liquid crystal display (LCD) or other suitable display device. Graphics subsystem 984 receives textual and graphical information, and processes the information for output to display 986. Additionally, the system of FIG. 10 includes output devices 978. Examples of suitable output devices include speakers, printers, network interfaces, monitors, etc.

The components contained in the computer system of FIG. 10 are those typically found in computer systems suitable for use with the technology described herein, and are intended to represent a broad category of such computer components that are well known in the art. Thus, the computer system of FIG. 10 can be a personal computer, mobile computing device, smart phone, tablet, workstation, server, minicomputer, mainframe computer, or any other computing device. The computer can also include different bus configurations, networked platforms, multi-processor platforms, etc. Various operating systems can be used.

One embodiment disclosed herein includes a method comprising receiving an electronic notification that a service provided by a managed application executing on a first computing device is degraded, and automatically correlating the service provided by the managed application to a modeled process that is executed on a second computing device. The modeled process is based on a subject process. An electronic alert is generated that warns that the degradation of the service provided by the managed application may impact the subject process.

One embodiment disclosed herein includes a computer program product comprising a computer readable storage medium having computer readable program code embodied therewith. The computer readable program code comprises computer readable program code configured to receive a notification that a managed application executing on a first computing device has a fault associated with an entry point. The computer readable program code also comprises computer readable program code configured to correlate the entry point to a modeled process that executes on a second computing device. The modeled process models a subject process. The computer readable program code also comprises computer readable program code configured to generate an alert that indicates the subject process may be impacted by the fault in the managed application.

One embodiment disclosed herein includes a system comprising a processor configured to provide identifiers of external services upon which business processes being executed on a first computing device depend upon an integration broker that executes on a second computing device. The external services are provided by a managed application. The processor is further configured to provide, to the integration broker, identifiers of entry points of the managed application that executes on a third server. The processor is further configured to receive a notification that a first of the entry points is compromised during execution of the managed application. The processor is further configured to correlate the first entry point to a first business process of the business processes by the integration broker. The processor is further configured to provide an electronic alert that indicates that a subject process that the first business process models is subject to be impacted as a result of the first entry point being compromised.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   accessing, by an integration broker, a first set of Uniform Resource Indicators (URIs) of entry points of a managed application that executes on a first computing device;
   accessing, by the integration broker, a description of a model that executes on a workflow engine on a second computing device, the description comprising a second set of URIs of external dependencies of the model, the model models a subject process that depends on the managed application;
   subscribing, by the integration broker, to electronic notifications from an application performance manager with respect to ones of the first set of URIs;
   monitoring the managed application using probes installed in bytecode in the managed application;
   determining performance of the managed application based on the monitoring;
   generating an electronic notification, by the application performance manager, that indicates that performance of the managed application with respect to a first URI in the first set of URIs is degraded;
   receiving, by the integration broker, the electronic notification that the performance of the managed application with respect to the first URI is degraded; and
   in response to matching the first URI in the electronic notification to a second URI in the second set of URIs, generating an electronic alert that identifies a portion of the model that is associated with the performance degradation with respect to the first URI of the managed application.

2. The method of claim 1, wherein the portion of the model that is associated with the performance degradation of the managed application with respect to the first URI is a step in the model.

3. The method of claim 1, wherein the generating an electronic alert comprises:
   identifying, within the electronic alert, an external service upon which the model is dependent during the execution on the workflow engine.

4. The method of claim 1, wherein the first URI is associated with an entry point of the managed application.

5. The method of claim 1, further comprising:
   accessing a file comprising computer executable descriptions of a plurality of models to be executed on the workflow engine, each of the descriptions comprises a set of URIs of external dependencies of the respective model, each of the models is for a subject process that depends on the managed application; and
   subscribing, by the integration broker, to electronic notifications from the application performance manager with respect to ones of the set of URIs of external dependencies of each of the respective models.

6. The method of claim 5, further comprising:
   receiving, by the integration broker, an electronic notification that the performance of the managed application with respect to a third URI is degraded; and
   in response to matching the third URI in the electronic notification to a fourth URI in the set of URIs of external dependencies of each of the respective models, generating one more electronic alerts that identifies a portion in one or more of the respective models that is associated with performance degradation of the managed application with respect to the third URI.

7. The method of claim 1, wherein the performance of the managed application is based on start and stop times of individual components within an execution flow of the managed application that are captured by the probes installed in bytecode in the managed application.

8. A computer program product comprising:
a non-transitory computer readable storage medium having computer readable program code embodied therewith, the computer readable program code comprising:
computer readable program code configured to access a first set of Uniform Resource Indicators (URIs) of entry points of a managed application that executes on a first computing device;
computer readable program code configured to access a description of a model that executes on a workflow engine on a second computing device, the description comprising a second set of URIs of external dependencies of the model, the model models a subject process that depends on the managed application;
computer readable program code configured to subscribe to electronic notifications from an application performance manager with respect to ones of the first set of URIs;
computer readable program code configured to determine performance of the managed application using probes installed in bytecode in the managed application;
computer readable program code configured to generate, based on the performance of the managed application, an electronic notification that the managed application has a fault associated with a first URI in the first set of URI;
computer readable program code configured to receive the electronic notification in response to subscribing to the electronic notifications;
computer readable program code configured to correlate the first URI in the electronic notification to a second URI in the second set of URIs; and
computer readable program code configured to, in response to correlating the first URI in the electronic notification to the second URI in the second set of URIs, generate an electronic alert that identifies a portion of the model that is associated with the performance degradation with respect to the first URI of the managed application.

9. The computer program product of claim 8, wherein the computer readable program code configured to correlate the first URI in the electronic notification to the second URI in the second set of URIs comprises:
computer readable program code configured to correlate an external service upon which the model depends during execution to an entry point of the managed application.

10. The computer program product of claim 8, further comprising:
computer readable program code configured to access a file comprising computer executable descriptions of models to be executed on the workflow engine, each of the descriptions comprises a set of URIs of external dependencies of the respective model, each of the models is for a subject process that depends on the managed application; and
computer readable program code configured to subscribe to electronic notifications from the application performance manager with respect to ones of the set of URIs of external dependencies for each of the respective models.

11. The computer program product of claim 8, wherein the model is a business process, the computer readable program code that generates that electronic alert being configured to identify a step in the business process impacted by the fault associated with the first URI.

12. A system comprising:
a processor configured to:
provide, to an integration broker, a first set of Uniform Resource Indicators (URIs) of entry points of a managed application that executes on a first computing device;
provide descriptions of business processes that execute on a workflow engine to an integration broker on a second computing device, the descriptions comprising second sets of URIs of external dependencies of the business processes, the business processes each model a subject process that depends on the managed application;
subscribe, by the integration broker, to electronic notifications from an application performance manager with respect to ones of the first set of URIs;
monitor the managed application using probes installed in bytecode in the managed application;
determine performance of the managed application based on the monitoring;
generate an electronic notification, by the application performance manager, that indicates that performance of the managed application with respect to a first URI in the first set of URIs is compromised;
receive, by the integration broker, the electronic notification that indicates the first URI is compromised;
correlate, by the integration broker, the first URI to second URI in the second sets of URIs and to a first business process of the business processes by the integration broker; and
in response to said correlating, provide an electronic alert that identifies a portion of the first business process that is associated with the performance degradation with respect to the first URI of the managed application.

13. The system of claim 12, wherein the processor being configured to correlate the first URI to the first business process comprises the processor being configured to:
determine a business process that depends upon the first URI.

14. The system of claim 13, wherein the processor being configured to provide descriptions of business processes that execute on a workflow engine comprises the processor being configured to:
access a Web Services Business Process Execution Language (WS-BPEL) file of computer executable descriptions of the business processes.

15. The system of claim 12, wherein the electronic alert identifies a step in the first business process that is associated with the performance degradation of the managed application with respect to the first URI.

16. The system of claim 12, wherein the processor is configured to request that the integration broker send an alert when any of the external dependencies are compromised during execution of the managed application.

* * * * *